United States Patent
Kariyazaki et al.

(10) Patent No.: US 11,731,187 B2
(45) Date of Patent: Aug. 22, 2023

(54) PRESS FORMING METHOD, RIGIDITY-IMPROVEMENT-POSITION SPECIFYING METHOD, PRESS FORMING SYSTEM, AND PRESS-FORMED PRODUCT

(71) Applicant: JFE STEEL CORPORATION, Tokyo (JP)

(72) Inventors: Yuta Kariyazaki, Tokyo (JP); Yusuke Fujii, Tokyo (JP); Yuji Yamasaki, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 305 days.

(21) Appl. No.: 16/966,401

(22) PCT Filed: Jan. 15, 2019

(86) PCT No.: PCT/JP2019/000889
§ 371 (c)(1),
(2) Date: Jul. 30, 2020

(87) PCT Pub. No.: WO2019/150933
PCT Pub. Date: Aug. 8, 2019

(65) Prior Publication Data
US 2020/0360981 A1    Nov. 19, 2020

(30) Foreign Application Priority Data
Jan. 30, 2018   (JP) .................. 2018-013146

(51) Int. Cl.
*G06F 30/17* (2020.01)
*B21D 22/26* (2006.01)
(Continued)

(52) U.S. Cl.
CPC ............. *B21D 22/26* (2013.01); *G06F 30/17* (2020.01); *G06F 30/20* (2020.01); *G06F 2113/24* (2020.01); *G06F 2119/14* (2020.01)

(58) Field of Classification Search
CPC ...... G06F 30/20; G06F 30/17; G06F 2113/24; G06F 2119/14; B21D 22/23
See application file for complete search history.

(56) References Cited

U.S. PATENT DOCUMENTS

2010/0005845 A1* 1/2010 Yoshida .................. B21D 5/00
                                                            72/31.01
2015/0066441 A1    3/2015 Niwa et al.
(Continued)

FOREIGN PATENT DOCUMENTS

CN    101482403 A    7/2009
CN    101546349 A    9/2009
(Continued)

OTHER PUBLICATIONS

Ishiwatari Akinobu, Urabe Masaki, Inazumi Toru. Press Forming Analysis Contributing to the Expansion of High Strength Steel Sheet Applications. JFE Technical Report, No. 18 (Mar. 2013) pp. 96-102 (Year: 2013).*
(Continued)

*Primary Examiner* — Chuen-Meei Gan
(74) *Attorney, Agent, or Firm* — Oliff PLC

(57) ABSTRACT

An object to provide a press-forming method that can efficiently suppress springback and easily specify a position where a springback reduction effect by rigidity improvement is large, and the press-forming method used in producing a press-formed product having a predetermined shape by press-forming a sheet material, the method including: a first process that repeatedly performs a springback analysis, while changing a position to be restricted, to specify a position where a springback reduction effect by rigidity
(Continued)

improvement is large; a second process that performs a rigidity improvement measure on a position of the sheet material corresponding to the position of the formed-product model specified in the first process; and a third process that produces the press-formed product by press-forming the sheet material on which the rigidity improvement measure has been performed.

7 Claims, 2 Drawing Sheets

(51) Int. Cl.
  *G06F 30/20* (2020.01)
  *G06F 119/14* (2020.01)
  *G06F 113/24* (2020.01)

(56) References Cited

U.S. PATENT DOCUMENTS

| | | | | |
|---|---|---|---|---|
| 2015/0168240 A1* | 6/2015 | Sumikawa | ............... | G01L 5/00 702/42 |
| 2015/0196950 A1* | 7/2015 | Saito | ....................... | B21K 7/12 156/196 |
| 2015/0205892 A1* | 7/2015 | Kano | ......................... | B21J 5/00 703/2 |
| 2015/0217356 A1* | 8/2015 | Saito | ....................... | B62D 65/00 703/6 |
| 2018/0075177 A1* | 3/2018 | Yoshida | ................. | G06F 30/23 |

FOREIGN PATENT DOCUMENTS

| | | |
|---|---|---|
| CN | 104226766 A | 12/2014 |
| CN | 104602835 A | 5/2015 |
| CN | 104755187 A | 7/2015 |
| EP | 2 058 062 A1 | 5/2009 |
| EP | 2 832 465 A1 | 2/2015 |
| JP | 2007229724 A * | 9/2007 |
| JP | 2007286841 A | 11/2007 |
| JP | 4596908 B2 | 12/2010 |
| JP | 5380890 B2 | 1/2014 |
| JP | 2014-046349 A | 3/2014 |
| JP | 5794025 B2 | 10/2015 |
| JP | 6060591 B2 | 1/2017 |
| JP | 6064447 B2 | 1/2017 |

OTHER PUBLICATIONS

Jiro Hiramoto, Masaki Urabe, Akinobu Ishiwatari and Toshiaki Urabe. Progress in Press Forming Computer Aided Analysis for High Strength Steel Sheet Applications, AIP Conference Proceedings 1567, pp. 1012-1015 (2013) (Year: 2013).*
R.H. Wagoner, J.F. Wang, and M. Li, Springback, ASM Handbook, vol. 14B: Metalworking: Sheet Forming,S.L. Semiatin, editor, p. 733-755, 2006 (Year: 2006).*
Ishiwatari A, Masaki U, Inazumi T. Press forming analysis contributing to the expansion of high strength steel sheet applications. JFE Technical Report; 2013. (Year: 2013).*
Feb. 15, 2021 Extended Search Report issued in European Patent Application No. 19746932.3.
Feb. 19, 2019 International Search Report issued in International Patent Application No. PCT/JP2019/000889.
Aug. 6, 2021 Office Action issued in Chinese Patent Application No. 201980009222.0.
Mar. 29, 2021 Office Action issued in Korean Patent Application No. 2020-7021013.

* cited by examiner

PRESS FORMING METHOD, RIGIDITY-IMPROVEMENT-POSITION SPECIFYING METHOD, PRESS FORMING SYSTEM, AND PRESS-FORMED PRODUCT

TECHNICAL FIELD

The present invention relates to a press forming method of reducing springback that occurs in sheet material press-forming including a plurality of press forming processes and increasing the dimensional accuracy of a press-formed product, a method of specifying a rigidity improvement position of a sheet material, a press forming system, and a press-formed product formed by the press forming method.

BACKGROUND ART

In recent years, the application of high strength steel sheets has been expanding to reduce the weight of automobile bodies for the purpose of improvement of fuel efficiency. The application of high strength steel sheets enables an increase in strength and rigidity of the automobile body and absorption energy at the time of collision without increasing the thickness.

However, in press-forming that is generally frequently used for processing a vehicle body component, improper shape fixability called springback becomes a problem. The springback occurs when a press-formed product obtained by press-forming a steel sheet, which is a sheet material, is removed from a die, and increases as the material strength of the steel sheet increases. The springback not only impairs the appearance quality, but also becomes a cause of improper welding during assembly. Therefore, the expansion of the application of high strength steel sheets requires springback measures.

The springback is caused by elastic recovery generated when a bending moment due to a non-uniform residual stress is released at the removal of the press-formed product from the die. Therefore, there has been conventionally proposed a method or the like that mitigates the non-uniformity of a residual stress as a springback measure.

Patent Literature 1 proposes a technique comprising forming an intermediate product arranged with an emboss on a stretch flange portion and an excess bead on a shrink flange portion, and crushing the emboss to apply a compressive stress to the stretch flange portion and a tensile stress to the shrink flange portion by the excess bead in formation of a final formed product, so that the residual stress distribution of the press-formed product is made uniform.

Patent Literature 2 proposes a technique in which a press forming analysis by the finite element method is performed, the shape of a press-formed product is divided into a plurality of regions, the residual stress before removal from a die in each region is determined, results of a springback analysis based on data after the residual stress is removed and results of a springback analysis based on data before the residual stress is removed are compared to calculate the contribution of the residual stress in each region with respect to the springback, a concave-and-convex portion is set at a portion corresponding to the bottom of a punch of a forming die with regard to a high contributory region, a material of a flange portion flows to the punch side near the bottom dead center during press-forming, and the movement of the material to the concave-and-convex portion generates a compressive stress against the outward tensile stress in the longitudinal direction of the flange portion to mitigate the tensile stress of the flange portion.

Patent Literature 3 proposes a technique in which any region of a plurality of regions obtained by dividing the shape of a press-formed product is selected, the Young's modulus of the selected region is changed in any of X, Y, and Z directions, a springback analysis is performed on the press-formed product after the change in Young's modulus, and a difference between the amount of springback of the press-formed product before the change in Young's modulus and the amount of springback of the press-formed product after the change in Young's modulus is acquired, and this processing is performed with respect to each selected region and with respect to each specified direction so as to determine a stress region and a stress direction effective for springback measures.

Patent Literature 4 proposes a technique in which a shape optimization analysis, e.g., a topology optimization analysis, is performed on an analytic model of a press-formed product to detect a position that makes a high contribution to the rigidity, and a rigidity improvement means is applied, e.g., fitting or placing a material having a large thickness or a high rigidity material to or on that position of a blank material, or placing the same material on that position of the blank material, so as to effectively suppress the springback.

CITATION LIST

Patent Literature

Patent Literature 1: JP5380890B
Patent Literature 2: JP5794025B
Patent Literature 3: JP6060591B
Patent Literature 4: JP6064447B

SUMMARY OF INVENTION

Technical Problem

As a method of making a residual stress uniform, Patent Literature 1 proposes a method of forming an emboss on a shrink flange portion and forming an excess bead on a stretch flange portion. However, in the case of a formed product having a complicated shape, it is not easy to specify a position where a countermeasure shape is given.

Moreover, as a method of mitigating a residual stress, Patent Literature 2 proposes a method of giving a concave-and-convex shape and Patent Literature 3 proposes a method of changing the Young's modulus in a specific direction to specify a stress region and direction effective for springback. However, in the case of a low rigid component, the springback occurs even with a low residual stress. Therefore, even when the residual stress in the specified position is reduced, the springback may remain with a residual stress of a different position. Moreover, the springback may occur with a new stress that is generated as a result of giving a shape in the specified position. Therefore, these are not sufficient as springback measures.

The method of detecting the rigidity contributory position according to Patent Literature 4 uses a shape optimization analysis, e.g., a topology analysis, and introduction thereof at an initial design stage enables high degree of freedom in design. However, the shape optimization analysis requires a high level of knowledge, and a practically impossible shape or a very complicated shape may be determined. Thus, there is inconvenience that an optimal formed product shape is not necessarily easily obtained.

Specifically, the problems of the conventional techniques to be solved are listed below.

(1) springback measures effective also for a component having a shape with low rigidity.
(2) a position where a springback reduction effect by rigidity improvement is large can be specified regardless of a component shape.
(3) a position where the rigidity improvement measure indicated in (2) above is taken can be easily specified.

The present invention has been made in view of the aforementioned problems, and it is an object of the present invention to specify a position effective for springback suppression by rigidity improvement and produce a press-formed product having a small amount of springback after press-forming and excellent shape fixability, by press-forming.

Solution to Problem

A press-forming method of the present invention that advantageously solves the aforementioned problems is:
a press-forming method used in producing a press-formed product having a predetermined shape by press-forming a sheet material, the method comprising:
a first process that repeatedly performs a springback analysis, while changing a position to be restricted, with an analysis model on which processing of virtually improving rigidity has been performed by restricting a stretch and shrink deformation while permitting rotation with respect to a specific position of a formed-product model having the predetermined shape, to specify a position where a springback reduction effect by rigidity improvement is large;
a second process that performs a rigidity improvement measure on a position of the sheet material corresponding to the position of the formed-product model specified in the first process; and
a third process that produces the press-formed product by press-forming the sheet material on which the rigidity improvement measure has been performed.

Moreover, a rigidity-improvement-position specifying method of the present invention that advantageously solves the aforementioned problems is:
a method for specifying a position of a sheet material used for producing, by press-forming, a press-formed product having a predetermined shape where a springback reduction effect by rigidity improvement is large the method comprising:
repeatedly performing a springback analysis, while changing a position to be restricted, with an analysis model on which processing of virtually improving rigidity has been performed by restricting a stretch and shrink deformation while permitting rotation with respect to a specific position of a formed-product model having the predetermined shape, to specify a position where a springback reduction effect by rigidity improvement is large; and
specifying the position of the sheet material where the springback reduction effect by rigidity improvement is large according to correspondence to a position of the formed-product model where the springback reduction effect by rigidity improvement is large.

Moreover, a press-forming system of the present invention that advantageously solves the aforementioned problems is:
a press-forming system used in producing a press-formed product having a predetermined shape by press-forming a sheet material, the press-forming system comprising:
a rigidity-improvement-position specifying apparatus that repeatedly performs a springback analysis, while changing a position to be restricted, with an analysis model on which processing of virtually improving rigidity has been performed by restricting a stretch and shrink deformation while permitting rotation with respect to a specific position of a formed-product model having the predetermined shape, to specify a position of the formed-product model where the springback reduction effect by rigidity improvement is large, and specifies a position of the sheet material where the springback reduction effect by rigidity improvement is large according to a corresponding relationship with a position of the formed-product model where the springback reduction effect by rigidity improvement is large; and
a press-forming apparatus that produces the press-formed product by press-forming the sheet material on which a rigidity improvement measure has been performed on the position where the rigidity-improvement-position specifying apparatus has specified that the springback reduction effect by rigidity improvement is large.

Furthermore, a press-formed product of the present invention that advantageously solves the aforementioned problems is produced by the press-forming method of the present invention.

Advantageous Effects of Invention

In a press-forming method of the present invention, in order to evaluate a springback reduction effect in the case where the rigidity of the press-formed product has been improved, rigidification is performed on a part of a formed-product model having the shape of the press-formed product to perform a springback analysis. The rigidification in the present invention is a method of virtually improving the rigidity by giving a deformation condition in which a stretch and shrink deformation is restricted while rotation is permitted with respect to a press-formed product at the bottom dead center of formation.

With the press-forming method of the present invention, the springback analysis is performed while variously changing the position where the aforementioned rigidification is performed, to specify a position of the formed-product model where the springback suppression effect by rigidity improvement is large, and the rigidity improvement measure is performed on the position of a sheet material corresponding to the specified rigidity improvement position of the formed-product model, so that the sheet material can efficiently suppress the springback. Since the press-formed product is produced by press-forming the sheet material, the springback of the press-formed product can be suppressed efficiently.

Besides, with the press-forming method of the present invention, in specifying an optimal rigidity improvement position, it is not necessary to perform an optimization analysis such as a topology analysis that requires a high level of knowledge or skill, and it is only necessary to repeatedly perform the springback analysis while changing the position where the rigidification is performed. Therefore, it is possible to easily specify the position where the springback reduction effect by rigidity improvement is large.

Moreover, with the press-forming method of the present invention, when the springback analysis is repeatedly performed while changing the position to be restricted in the first process,
first, such processing may be performed that the entire formed-product model is divided to set a plurality of initial division positions, these initial division positions are sequentially subjected to the springback analysis as the position to be restricted, and among these initial division positions, the position where the springback reduction effect by rigidity improvement is large is specified, and then, such processing may be performed once or repeatedly that the position previously specified where the springback reduction effect by rigidity improvement is large is divided to set a plurality of subdivision positions, these subdivision positions are sequentially subjected to the springback analysis as the position to be restricted, and among the subdivision positions, the position where the springback reduction effect by rigidity improvement is large is further narrowed and specified.

In this way, it is possible to specify the position where the springback reduction effect by rigidity improvement is large efficiently and precisely.

Moreover, with the rigidity-improvement-position specifying method of the present invention, in specifying the position of a sheet material used for producing, by press-forming, a press-formed product having a predetermined shape where the springback reduction effect by rigidity improvement is large, the springback analysis is repeatedly performed while changing the position to be restricted with an analysis model on which the processing of virtually improving the rigidity has been performed by restricting a stretch and shrink deformation while permitting rotation with respect to the specific position of the formed-product model having the predetermined shape, so that that the position of the formed-product model where the springback reduction effect by rigidity improvement is large is specified, and the position of the sheet material where the springback reduction effect by rigidity improvement is large is specified according to the corresponding relationship with the position of the formed-product model where the springback reduction effect by rigidity improvement is large, and thus it is possible to easily specify the position where the springback reduction effect by rigidity improvement is large.

Meanwhile, with the press-forming system of the present invention, the rigidity-improvement-position specifying apparatus repeatedly performs the springback analysis while changing the position to be restricted using the analysis model on which the processing of virtually improving the rigidity has been performed by restricting only the stretch and shrink deformation of the specified position of the formed-product model having the predetermined shape to specify the position of the formed-product model where the springback reduction effect by rigidity improvement is large, and specifies the position of the sheet material where the springback reduction effect by rigidity improvement is large according to the corresponding relationship with the position of the formed-product model where the springback reduction effect by rigidity improvement is large, and the press-forming apparatus, i.e., a press die produces the press-formed product by press-forming the sheet material on which the rigidity improvement measure has been performed on the position where the rigidity-improvement-position specifying apparatus has specified that the springback reduction effect by rigidity improvement is large.

Accordingly, with the press-forming system of the present invention, the springback of the press-formed product can be suppressed efficiently.

Furthermore, the press-formed product of the present invention is produced by the press-forming method of the present invention, and therefore the springback can be suppressed efficiently.

DESCRIPTION OF EMBODIMENTS

The press-forming method of an embodiment of the present invention first determines whether the press-forming method of the present embodiment can be applied in forming a blank made of a sheet material into a press-formed product having a predetermined shape by press-forming on the basis of information of the material, the shape, or the like of the press-formed product. When it is determined that the press-forming method of the present embodiment can be applied, the position of the formed-product model where the springback reduction effect by rigidity improvement is large is specified (first process), a measure of improving the rigidity is performed on the position of the blank corresponding to the position of the formed-product model specified in the first process (second process), and press-forming is performed on the blank.

The sheet material of the press-formed product to which the press-forming method of the present embodiment can be applied is preferably a steel sheet in which the material strength has a tensile strength of 440 MPa or more, and more ideally a steel sheet having a tensile strength of 780 MPa or more is desirable. This is because press-forming by a different press-forming method is difficult. Moreover, regarding the shape of the press-formed product to which the press-forming method of the present embodiment can be applied, the lateral (X-axis direction in FIG. 4) length after press-forming is equal to or more than 300 times the thickness and equal to or more than 10 times the height of the press-formed product. For example, an automobile body component made of a steel sheet often has such shape of the press-formed product. Note that the determination as to whether the press-forming method of the present embodiment regarding the shape of the press-formed product can be applied may calculate a second moment of area from the cross-sectional shape of the press-formed product, and the calculated second moment of area may be used as a threshold.

Figure 1:
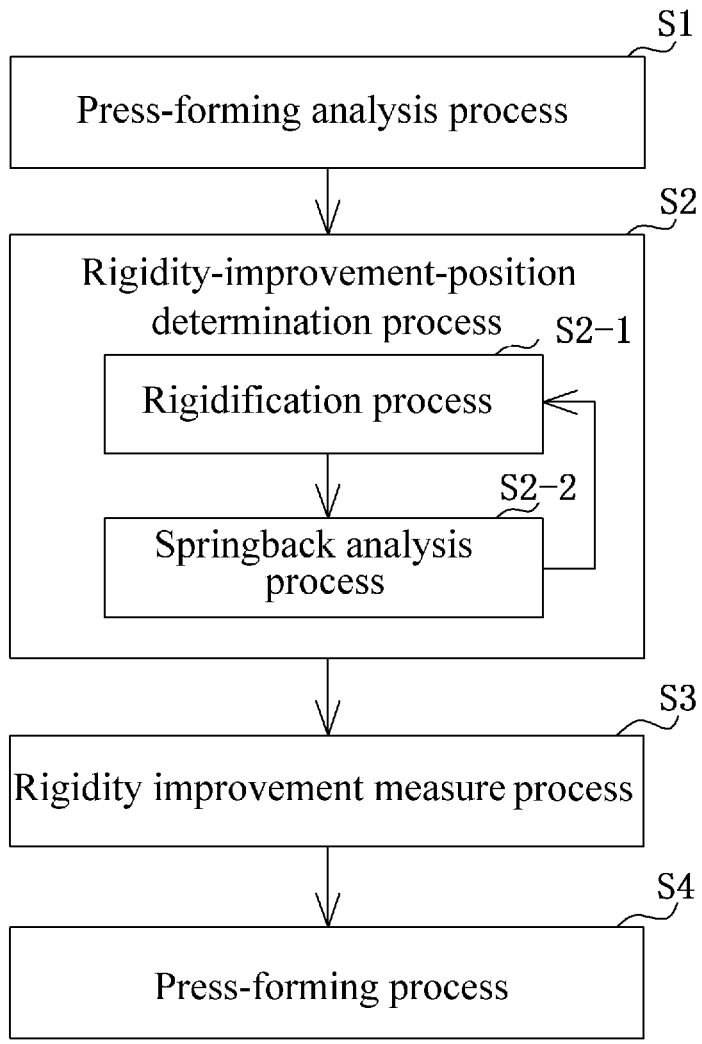
FIG. 1 is a process diagram illustrating, in a flowchart, a procedure of performing a press-forming method of an embodiment of the present invention performed by a press-forming system of an embodiment of the present invention and a rigidity-improvement-position specifying method of an embodiment of the present invention therein.
Figure 2:
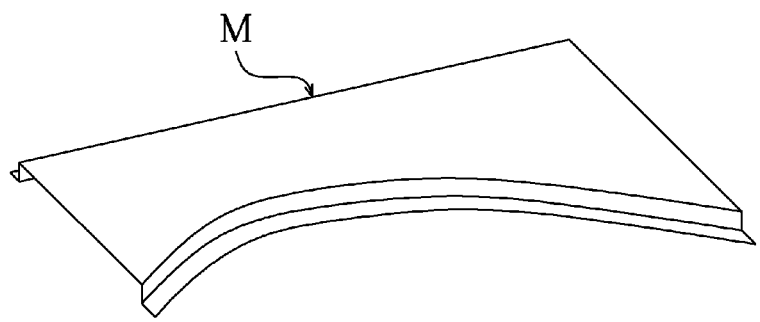
FIG. 2 is a perspective view schematically illustrating an example of a press-formed product and a formed-product model having the shape of the press-formed product in the press-forming method of the aforementioned embodiment performed by the press-forming system of the aforementioned embodiment.

The press-forming system of the present embodiment, the press-forming method of the present embodiment, and the rigidity-improvement-position specifying method of the present embodiment are described below in conjunction with the flowchart illustrated in FIG. 1 and the press-formed product example illustrated in FIG. 2. FIG. 1 is a process diagram illustrating, in a flowchart, the procedure of performing the press-forming method of an embodiment of the present invention performed by the press-forming system of an embodiment of the present invention and the rigidity-improvement-position specifying method of an embodiment of the present invention therein, and FIG. 2 is a perspective view schematically illustrating, obliquely from above, an example of the press-formed product and the formed-product model having the shape of the press-formed product in the press-forming method of the aforementioned embodiment performed by the press-forming system of the aforementioned embodiment.

The press-forming method of the present embodiment includes, as indicated in the flowchart of FIG. 1, a total of four processes: press-forming analysis process S1 to press-forming process S4. In the first press-forming analysis process S1, first, a formed-product model (the same reference sign M as the press-formed product is used for the sake of convenience) of a press-formed product M illustrated, for example, in FIG. 2 is formed on the basis of a press die shape, a blank shape, a blank material, and the like, press-forming is simulated by numerical calculation with the finite element method by a typical computer using the formed-product model M, and the formed shape of the press-formed product M at the bottom dead center of formation of the press die and a residual stress of each part of the formed shape are obtained.

The next rigidity-improvement-position determination process S2 includes rigidification process S2-1 and springback analysis process S2-2, which are executed by the aforementioned typical computer. In the rigidification process S2-1, the press-formed product M at the bottom dead center of formation is divided into a plurality of regions, the rigidification in which a stretch and shrink deformation is restricted while rotation is permitted is performed on each region to form an analysis model. Then, in the springback analysis process S2-2, the final shape after release of the residual stress of each part of the analysis model at the bottom dead center of formation of the press die is analyzed.

That is, in the rigidification process S2-1 and the springback analysis process S2-2 of the rigidity-improvement-position determination process S2, the springback reduction effect by rigidity improvement is evaluated by performing the rigidity-improvement-position specifying method of the aforementioned embodiment in which the amount of springback in a case where the rigidification is not performed is compared with the amount of springback in a case where the rigidification has been performed in each region. For this evaluation, as the amount of springback, as will be described below, "falling" or "rising" and "twisting" at an end of the analysis model are compared. At this time, the springback analysis is repeatedly performed while the division region of the press-formed product M is gradually narrowed, and thus the position where the effect of rigidity improvement is large can be specified.

Figure 3:
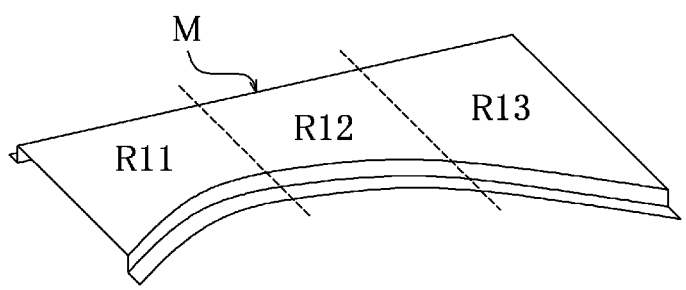
FIG. 3 is an explanatory view illustrating an example of division for largely dividing the formed-product model of the aforementioned example into three regions.

For example, FIG. 3 is an explanatory view illustrating, obliquely from above, an initial division example where the entire formed product model M of the aforementioned example is divided into three major regions for the first time. As illustrated in FIG. 3, the entire formed-product model M at the bottom dead center of formation of the press die is divided into three in the longitudinal direction thereof to set three initial division regions (initial division positions) R11, R12, and R13. Then, the rigidification in which a stretch and shrink deformation is restricted while rotation is not restricted is performed on each initial division region R11 to R13 of the formed-product model M to form the analysis model and the springback analysis is performed.

Figure 4:
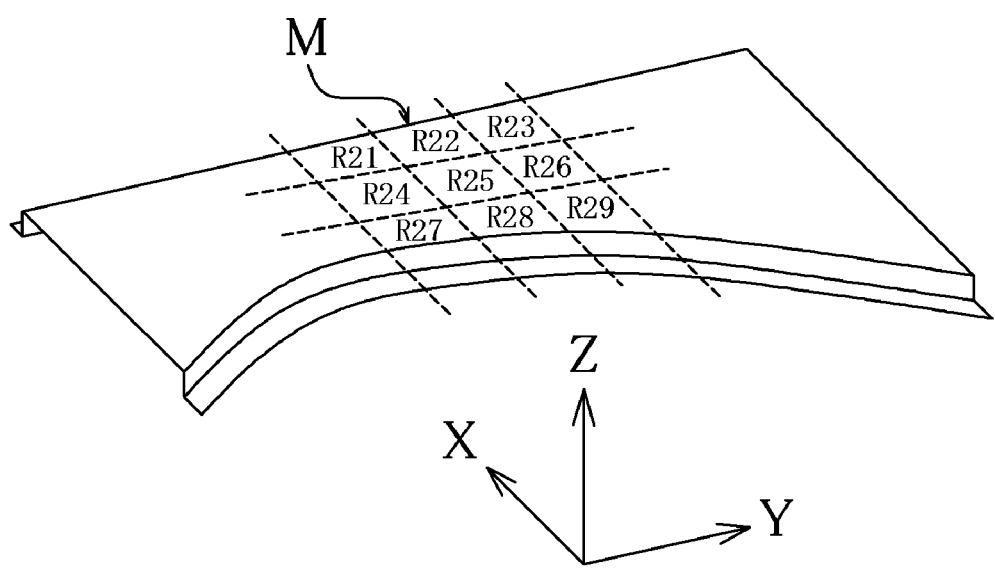
FIG. 4 is an explanatory view illustrating an example of division for further subdividing a middle region where the springback reduction effect by rigidity improvement has been found to be large among the three regions of the formed-product model of the aforementioned example into nine.

FIG. 4 is an explanatory view illustrating, obliquely from above, a subdivision example where the initial division region R12, which has been found to have a large springback effect by rigidity improvement among the three initial division regions R11, R12, and R13 of the formed-product model M of the aforementioned example, is further subdivided into nine. As indicated by a coordinate system in FIG. 4, the lateral direction of the formed-product model M is an X direction; the longitudinal direction is a Y direction; the height direction is a Z direction; a plus side in the Y direction is a rightward direction on the sheet of paper; a minus side is a leftward direction on the sheet of paper; a plus side in the Z direction is a front-side direction on the sheet of paper; and a minus side is a back-side direction on the sheet of paper. The "falling" is a phenomenon of displacing in the minus side in the Z direction due to springback, the "rising" is a phenomenon of displacing in the plus side in the Z direction due to springback, and the "twisting" is a phenomenon in which the formed-product model M is twisted because the amount of displacement in the Z direction varies with location.

In the rigidity-improvement-position determination process S2, the amount of springback of the formed-product model M in a case where the rigidification is not performed on any initial division region is compared with the amount of springback of the formed-product model M in a case where the rigidification has been performed on each initial division region R11 to R13 in terms of the amount of falling or the amount of rising and the angle of twist. For example, when the springback reduction effect of the initial division region R12 is the largest, as illustrated in FIG. 4, the initial division region R12 is further subdivided to set nine subdivision regions (subdivision positions) R21 to R29, and the rigidification is performed on each subdivision region as in the case of the initial division regions to form the analysis model, and the springback analysis is performed to make a comparison with respect to the amount of falling or the amount of rising and the angle of twist as the amount of springback. The above-described process of the subdivision and the springback analysis is performed once or repeatedly twice or more after the initial division and the springback analysis to further narrow the region (position) where the springback reduction effect by rigidity improvement is large, so that the position where the springback reduction effect by rigidity improvement is the largest can be specified efficiently and precisely.

In the rigidity improvement measure process S3, the rigidity improvement measure is performed partially on the position of the actual blank corresponding to the position of the formed-product model M specified in the rigidity-improvement-position determination process S2 where the springback reduction effect by rigidity improvement is large. As a measure method of partially improving the rigidity of the blank, a method of increasing the thickness of the relevant position of the blank, a method of applying the same material as the blank or a material whose rigidity is higher than that material to the relevant position of the blank, a method of replacing the material of the relevant position of the blank with a different material having high rigidity, a method of applying a concave-and-convex shape to the position, or the like can be properly selected and applied depending on the shape of the press-formed product, the die structure, and the like.

Then, in the press-forming process S4, the press-formed product M is press-formed using the press die determined up to the previous process and the blank on which the rigidity improvement measure has been performed.

Accordingly, the aforementioned press-forming analysis process S1 and rigidity-improvement-position determination process S2 correspond to the first process of the press-forming method of the present invention, and the aforementioned rigidity improvement measure process S3 and the aforementioned press-forming process S4 correspond to the second process and the third process of the press-forming method of the present invention, respectively. Moreover, the aforementioned computer that executes, on the basis of a preliminarily given program, the aforementioned press-forming analysis process S1 and rigidity-improvement-position determination process S2 corresponds to the rigidity-improvement-position specifying apparatus of the press-forming system of the present invention. The aforementioned press die that press-forms the press-formed product M in the aforementioned press-forming process S4 corresponds to the press-forming apparatus of the press-forming system of the present invention. Furthermore, the aforementioned rigidity-improvement-position determination process S2 performs the rigidity-improvement-position specifying method of the aforementioned embodiment.

EXAMPLES

An example of the present embodiment is described below. The press-forming method of this example is applied to press-forming of a front pillar lower inner material, which is a vehicle component, as a springback measure for a low-rigidity vehicle body component. Applied specs and mechanical property values are described below.

Applied specs: 980 MPa-class high-tensile steel sheet/0.9 mm thickness/front pillar lower inner Mechanical property values: YP: 620 MPa, TS: 1030 MPa, El: 15%

The shape of the press-formed product M of the aforementioned applied specs is illustrated in FIG. 2. As described in the aforementioned embodiment, first, press-forming analysis is performed to obtain the component shape and the stress state of the vehicle component at the bottom dead center of the press die. Then, as illustrated in FIG. 3, the shape of the press-formed product M is divided into three to specify the rigidity effective position, which is the position where the springback reduction effect by rigidity improvement is large, and the rigidification is performed on the mutually different initial division regions, and the springback analysis is performed on each of the three analysis models.

As a result of the aforementioned springback analysis, the effect is the largest at the initial division region (position) R12, which is the middle portion of the component. Therefore, in this example, as illustrated in FIG. 4, the initial division region (position) R12 is further subdivided into nine. The rigidification is performed on the mutually different subdivision regions, and the springback analysis is performed on each of the nine analysis models. As a result, the effect is the largest at the subdivision region (position) R23. Therefore, the subdivision region (position) R23 obtained by further narrowing the initial division region (position) R12, which has been previously specified as the rigidity effective position, is specified (updated) as the rigidity effective position.

In the aforementioned example, falling and twisting occur as springback. Table 1 below indicates analysis results of rigidified positions and the amount of springback (amount of falling and angle of twist) of the aforementioned example. Note that, in Table 1, rigidified position R0 indicates the case where the rigidification is not performed. Moreover, the bold indicates a region (position) where the effect of the rigidification is the largest regarding the analysis model of FIG. 3 and the subdivision analysis model of FIG. 4.

TABLE 1

| Rigidification position | Falling amount (dimensionless quantity) | Twist angle (deg.) |
| --- | --- | --- |
| R0 | 0.36 | 1.9 |
| R11 | 0.01 | 1.9 |
| R12 | 0.12 | 0.5 |
| R13 | 0.49 | 0.9 |
| R21 | 0.69 | 5.1 |
| R22 | 0.42 | 2.3 |
| R23 | 0.18 | 0.9 |
| R24 | 0.35 | 1.0 |
| R25 | 0.42 | 1.3 |
| R26 | 0.19 | 1.4 |
| R27 | 0.34 | 0.3 |
| R28 | 0.24 | 2.2 |
| R29 | 0.24 | 1.1 |

The rigidification is performed on the blank position R23 specified in this example. By practically press-forming with the blank, it is possible to produce the press-formed product M of the aforementioned applied specs that has a small amount of springback after press-forming and excellent shape fixability.

Description has been provided heretofore on the basis of the illustrated example. However, the press-forming method, the rigidity-improvement-position specifying method, the press-forming system, and the press-formed product of the present invention are not limited to the aforementioned example, but can be properly changed within the scope of the claims. For example, the shape of the press-formed product may be those other than that illustrated in FIG. 2, and the division form of the formed-product model may be those other than that illustrated in FIGS. 3 and 4.

INDUSTRIAL APPLICABILITY

Thus, it is possible to efficiently suppress the springback using the press-forming method, the press-forming system, and the press-formed product of the present invention, and moreover it is possible to easily specify the position where the springback reduction effect by rigidity improvement is large.

Moreover, it is possible to easily specify the position where the springback reduction effect by rigidity improvement is large using the rigidity-improvement-position specifying method of the present invention.

REFERENCE SIGNS LIST

M press-formed product (formed-product model)
R11 to R13 initial division region
R21 to 29 subdivision region
S1 press-forming analysis process
S2 rigidity-improvement-position determination process
S2-1 rigidification process
S2-2 springback analysis process
S3 rigidity improvement measure process
S4 press-forming process

The invention claimed is:

1. A press-forming method used in producing a press-formed product having a predetermined shape by press-forming a sheet material, the method comprising:

a first process that repeatedly performs a springback analysis, while changing a position to be restricted, with an analysis model on which processing of virtually improving rigidity has been performed by restricting a stretch and shrink deformation while permitting rotation with respect to a specific position of a formed-product model having the predetermined shape, to specify a position where a springback reduction effect by rigidity improvement is largest;

a second process that performs a rigidity improvement measure on a position of the sheet material corresponding to the position of the formed-product model specified in the first process;

a third process that produces the press-formed product by press-forming the sheet material on which the rigidity improvement measure has been performed, wherein a lateral length of the press-formed product is 10 times or more of a height of the press-formed product after press-forming.

2. The press-forming method according to claim 1, wherein when the springback analysis is repeatedly performed while changing the position to be restricted in the first process:

first, processing is performed in which the entire formed-product model is divided to set a plurality of initial division positions, these initial division positions being sequentially subjected to the springback analysis as the position to be restricted, and among these initial division positions, the position where the springback reduction effect by rigidity improvement is largest is specified, and then, processing is performed once or repeatedly in which a previously specified position where the springback reduction effect by rigidity improvement is largest is divided to set a plurality of subdivision positions, these subdivision positions are sequentially subjected to the springback analysis as the position to be restricted, and among the subdivision positions, the position where the springback reduction effect by rigidity improvement is largest is further narrowed and specified.

3. A rigidity-improvement-position specifying method for specifying a position of a sheet material used for producing, by press-forming, a press-formed product having a predetermined shape where a springback reduction effect by rigidity improvement is largest, the method comprising:

repeatedly performing a springback analysis, while changing a position to be restricted, with an analysis model on which processing of virtually improving rigidity has been performed by restricting a stretch and shrink deformation while permitting rotation with respect to a specific position of a formed-product model having the predetermined shape, to specify a position of the formed-product model where a springback reduction effect by rigidity improvement is largest;

specifying the position of the sheet material where the springback reduction effect by rigidity improvement is largest according to correspondence to the specified position of the formed-product model where the springback reduction effect by rigidity improvement is largest; and producing the press-formed product based on the specified position of the sheet material where the springback reduction effect by rigidity improvement is largest, wherein a lateral length of the press-formed product is 10 times or more of a height of the press-formed product after press-forming.

4. A press-forming system used in producing a press-formed product having a predetermined shape by press-forming a sheet material, the press-forming system comprising:

a rigidity-improvement-position specifying apparatus configured to repeatedly perform a springback analysis, while changing a position to be restricted, with an analysis model on which processing of virtually improving rigidity has been performed by restricting a stretch and shrink deformation while permitting rotation with respect to a specific position of a formed-product model having the predetermined shape, to specify a position of the formed-product model where a springback reduction effect by rigidity improvement is largest, and configured to specify a position of the sheet material where the springback reduction effect by rigidity improvement is largest according to a corresponding relationship with the position of the formed-product model where the springback reduction effect by rigidity improvement is largest; and a press-forming apparatus that produces the press-formed product by press-forming the sheet material on which a rigidity improvement measure has been performed on the position where the rigidity-improvement-position specifying apparatus has specified that the springback reduction effect by rigidity improvement is largest, wherein a lateral length of the press-formed product is 10 times or more of a height of the press-formed product after press-forming.

5. The press-formed product produced by the press-forming method according to claim 1.

6. The press-formed product produced by the press-forming method according to claim 2.

7. The press-forming method according to claim 1, wherein the springback analysis includes analyzing displacement in a height direction of the formed-product model.

* * * * *